(12) United States Patent
Moulin et al.

(10) Patent No.: US 11,999,566 B2
(45) Date of Patent: Jun. 4, 2024

(54) OVERHEAD RAIL BASED ORDER DELIVERY SYSTEM AND METHOD

(71) Applicant: EXOTEC, Croix (FR)

(72) Inventors: Romain Moulin, Lille (FR); Renaud Heitz, Villeneuve-d'Ascq (FR); Gilles Baulard, Fontenilles (FR)

(73) Assignee: EXOTEC, Croix (FR)

( * ) Notice: Subject to any disclaimer, the term of this patent is extended or adjusted under 35 U.S.C. 154(b) by 208 days.

(21) Appl. No.: 17/626,668

(22) PCT Filed: Sep. 2, 2020

(86) PCT No.: PCT/EP2020/074489
§ 371 (c)(1),
(2) Date: Jan. 12, 2022

(87) PCT Pub. No.: WO2021/043837
PCT Pub. Date: Mar. 11, 2021

(65) Prior Publication Data
US 2022/0281688 A1 Sep. 8, 2022

(30) Foreign Application Priority Data

Sep. 2, 2019 (FR) ........................ 1909641
Nov. 12, 2019 (FR) ........................ 1912642

(51) Int. Cl.
*G06Q 10/0836* (2023.01)
*B65G 1/04* (2006.01)
(Continued)

(52) U.S. Cl.
CPC ......... *B65G 1/0457* (2013.01); *B65G 1/1378* (2013.01); *G06Q 10/0836* (2013.01);
(Continued)

(58) Field of Classification Search
CPC ...... B65G 47/61; B65G 47/38; B65G 47/905; B65G 17/20; B65G 47/08; B65G 1/1376;
(Continued)

(56) References Cited

U.S. PATENT DOCUMENTS 3,647,026 A  3/1972 Alexander et al.
7,381,022 B1  6/2008 King
(Continued)

FOREIGN PATENT DOCUMENTS

BE  1019931 A3  2/2013
DE  19717352 A1  10/1997
(Continued)

OTHER PUBLICATIONS

English translation of the Written Opinion of the International Searching Authority dated Feb. 16, 2021 for corresponding International Application No. PCT/EP2020/074489, filed Sep. 2, 2020.
(Continued)

*Primary Examiner* — Gregory W Adams
(74) *Attorney, Agent, or Firm* — David D. Brush; Westman, Champlin & Koehler, P.A.

(57) ABSTRACT

A system for automatic delivery of an order in bags to a pick-up location outside a building. Such a system includes: a device for signalling and/or detecting presence of a customer in the vicinity of the pick-up location; and a height-mounted transport module, which includes: a plurality of elements for suspending the bags from a track; an automatic displacement device for automatically moving the suspension elements on said track; and an actuator for actuating said automatic displacement device to displace the bags in which the various parts of said order have been deposited, to said pick-up location when said signalling and/or detection device emits a signal confirming the presence of said user in the vicinity of said pick-up location.

12 Claims, 7 Drawing Sheets

(51) Int. Cl.
*B65G 1/137* (2006.01)
*G06Q 10/087* (2023.01)
*G06Q 10/08* (2023.01)

(52) U.S. Cl.
CPC ... *G06Q 10/087* (2013.01); *B65G 2201/0238* (2013.01); *B65G 2209/04* (2013.01); *B65G 2209/08* (2013.01); *G06Q 10/08* (2013.01)

(58) Field of Classification Search
CPC ........ B65G 2209/02; B65G 2201/0238; B65G 1/1378; B65G 1/1373; B65G 1/0457
See application file for complete search history.

(56) References Cited

U.S. PATENT DOCUMENTS

| | | | | |
|---|---|---|---|---|
| 2013/0240328 A1* | 9/2013 | Nukui | ................... | B65G 47/24 |
| | | | | 198/604 |
| 2015/0259153 A1* | 9/2015 | Buchmann | ............. | B65G 37/02 |
| | | | | 198/583 |
| 2016/0125685 A1* | 5/2016 | Odisho | ................... | G07F 17/10 |
| | | | | 198/678.1 |
| 2020/0189846 A1 | 6/2020 | Sutter | | |

FOREIGN PATENT DOCUMENTS

| | | | | |
|---|---|---|---|---|
| DE | 10147551 A1 | 4/2003 | | |
| DE | 102009014457 A1 | 10/2010 | | |
| EP | 1801040 A1 | 6/2007 | | |
| FR | 2667849 A1 | 4/1992 | | |
| GB | 2294437 A | 5/1996 | | |
| JP | 2002249209 A * | 9/2002 | .......... | B65G 1/1378 |
| JP | 2002249209 A | 9/2002 | | |
| WO | WO-2015118182 A1 * | 8/2015 | .......... | B65G 1/1378 |
| WO | 2018162123 A1 | 9/2018 | | |

OTHER PUBLICATIONS

English translation of the Written Opinion of the International Searching Authority dated Jan. 21, 2021 for corresponding International Application No. PCT/EP2020/074474, filed Sep. 2, 2020.
International Search Report dated Feb. 5, 2021 for corresponding International Application No. PCT/EP2020/074489, dated Sep. 2, 2020.
Written Opinion of the International Searching Authority dated Feb. 5, 2021 for corresponding International Application No. PCT/EP2020/074489, filed Sep. 2, 2020.
International Search Report dated Jan. 11, 2021 for corresponding International Application No. PCT/EP2020/074474, dated Sep. 2, 2020.
Written Opinion of the International Searching Authority dated Jan. 11, 2021 for corresponding International Application No. PCT/EP2020/074474, filed Sep. 2, 2020.

* cited by examiner

OVERHEAD RAIL BASED ORDER DELIVERY SYSTEM AND METHOD

1. CROSS-REFERENCE TO RELATED APPLICATIONS

This Application is a Section 371 National Stage Application of International Application No. PCT/EP2020/074489, filed Sep. 2, 2020, which is incorporated by reference in its entirety and published as WO 2021/043837 A1 on Mar. 11, 2021, not in English.

2. FIELD OF THE INVENTION

The field of the invention is that of logistics in stores and warehouses, and in particular the transport and sorting of articles.

More specifically, the invention relates to a system and a method for delivering an order.

The invention is particularly applicable to the collection of food or consumer products at a collection point, also known as a "drive", and to the delivery of goods at relay points.

3. STATE OF THE ART

It is known in stores offering a delivery service for orders placed online at a collection point, known as a "drive-through" service, that one or more pickers store the items of an order collected in bags on shelves, while waiting for the customer to come and collect the order. The sorting of the items of an order can be implemented during the pick-up round or when the order is put on the shelf.

This order picking technique has many disadvantages.

It requires a significant amount of storage space to store orders and a large workforce.

In addition, with this technique, a customer who comes to pick up his order may have to wait for a while for a picker to get his order from the shelves and deliver it to him, or in the case where all the pickers are busy with a pick-up round and are not available to deliver his order.

In order to limit the waiting time of a customer, it was thought to deposit the bags in bins which are sent to a storage space of an automated bin storage system allowing an easy delivery of his order to the customer.

A disadvantage of this technique using bins is that it requires the management of bins.

Another disadvantage of this technique is that it is expensive to implement. It has also been noted that in many large and medium-sized stores, the cost of installation is prohibitive.

4. SUMMARY

An exemplary aspect of the present disclosure relates to a system for automatically delivering an order, consisting of a plurality of items stored in a building, in one or more bags to a pick-up location for said order located outside said building.

According to the invention, such a system for automatic delivery of an order comprises:
 a transport module mounted at least partially at height and comprising:
  at least one travel track, at least a substantial portion of which extends into said building;
  a plurality of bag suspension elements to said track;
  means for automatically moving said suspension elements on said track;
  means for associating with one or more suspension elements from which said bag or bags containing the various articles of said order are suspended, information for identifying said order;
  means for signalling and/or detecting the presence of a user to whom the order is to be delivered, or of a truck intended to take charge of said order, in the vicinity of said pick-up location;
 said transport module further comprising means for actuating said automatic displacement means configured to displace said suspension elements, from which said bags are suspended, to said picking location when said signalling and/or detection means emit a signal confirming the presence of said user or of said truck in proximity to said picking location.

Thus, in a novel way, the invention proposes to suspend bags containing the articles of an order at such a height as to be able to store them and transport them to a pick-up location outside a store, where the order will be handed over automatically to the customer to whom the order is addressed, or to a delivery truck upon its arrival, in the vicinity of the pick-up location.

The sampling location can be, for example, a dedicated parking area of a "drive" and be located more or less close to a store, or the storage volume of a truck.

In the context of the invention, the term "in the vicinity" means that the recipient of the order is less than a few metres, or even a few hundred metres, from the pick-up location. Thus, for example, it may be provided that the signalling and/or detection means are configured to emit a signal confirming the presence of the user or the truck when the latter stops in the immediate vicinity of the picking location or, in another embodiment, when the user or the truck passes through an entrance to the store's parking lot or passes through a specific location in the parking lot.

Finally, it should be noted that because the bags are suspended high up, the invention saves a lot of floor space.

Furthermore, in the context of the invention, the bags may be formed in whole or in part of rigid portions, for example to be able to carry heavy articles, or to protect fragile objects, such as egg boxes, for example.

It should also be noted that in the context of the invention the track may extend both inside and outside the building or only inside the building.

According to a particular embodiment of the invention, said track comprises a chain housed in a rail.

In an advantageous embodiment of the invention, said track is attached to a ceiling or mezzanine of said building.

In an alternative embodiment of the invention, it may be envisaged to attach said track to a dedicated carrying structure, comprising for example one or more gantries.

Advantageously, said transport module comprises suspension element sorting means for grouping suspension elements supporting bags containing articles of the order and to which identification information of said order has been associated in at least one area of said building.

Thus, the bags containing the articles of the same order can be grouped together beforehand, which allows a faster delivery of the order.

According to an aspect of the invention, said signalling and/or detection means comprise at least one signalling and/or detection element belonging to the group comprising at least:
 barcode reader;
 QR code reader;

magnetic strip or chip reader;
numeric keypad to enter a code;
dedicated application downloadable on a user's terminal;
biometric identification reader, such as a fingerprint reader;
presence sensor;
geolocation system.

In a particular embodiment of the invention, said. suspension elements belong to the group comprising at least:
hooks;
bar.

Advantageously, said transport module comprises means for temporarily storing at least one of said bags suspended from a suspension element in at least one high storage area of said building.

Several high storage areas can be provided to store different types of items.

In a particularly advantageous embodiment of the invention, said storage area is a temperature controlled area.

These areas can be positive cold storage areas or negative temperature storage areas, suitable for frozen products. In this way, fresh or frozen products can be taken in advance from the shelves of a shop or from cold rooms and stored on the transport module while waiting to hand over the order to the customer or to a truck that has come to collect the order.

According to a particular embodiment of the invention, said transport module comprises a tunnel enveloping a portion of said track, extending outside of said building over a motor vehicle traffic lane.

This allows the recipient of an order to easily access the pick-up location with his vehicle and to load his order directly into his trunk.

According to a particular embodiment of the invention, said location for picking up said order is the loading volume of a truck.

Thus, you can easily load an order into a truck, which will ensure its delivery to a relay point.

In a particular embodiment of the invention, an automatic order delivery system as described above comprises a bag storage module, to be mounted in the loading volume of said truck, and means for connecting said bag storage module with said track, including means for transferring the suspension elements from which said bags are suspended from said storage module to said track.

Thus it is possible to transfer bags directly from an order to a truck, or conversely to empty a truck, without human intervention.

The invention also relates to a method of automatically delivering an order, consisting of a plurality of items stored in a building, to a pick location for said order located outside said building.

According to the invention, such a method comprises the following steps:
collecting the articles constituting said order and deposit of said articles in at least one bag;
suspending said bag or bags from one or more bag suspension elements on a track of a transport module mounted at least partially at height;
associating with said suspension element(s) from which said bag(s) containing the different articles of said order are suspended an identification information of said order;
signalling and/or detecting the presence of a user to whom the order is to be delivered, or of a truck intended to take charge of said order, in the vicinity of said pick-up location, comprising a step of transmitting a signal confirming the presence of said user or said truck in the vicinity of said pick-up location;
upon reception of said signal by a receiver unit, transport of said suspension element or elements to which has or have been associated an identification information of the order on said track to said pick-up location comprising a step of actuating means for automatic displacement of said suspension elements on said track.

According to an advantageous aspect of the invention, such a method comprises a step of sorting the suspension elements comprising a step of grouping the suspension elements carrying the bags of the order and to which has been associated an identification information of said order in at least one zone of said building.

5. LIST OF FIGURES

Other features and advantages of the invention will become clearer upon reading the following description of two embodiments of the invention, given as mere illustrative and non-limiting examples, and of the appended drawings among which:

6. DETAILED DESCRIPTION OF THE INVENTION

6.1. Example of an Embodiment of the Invention

Figure 1:
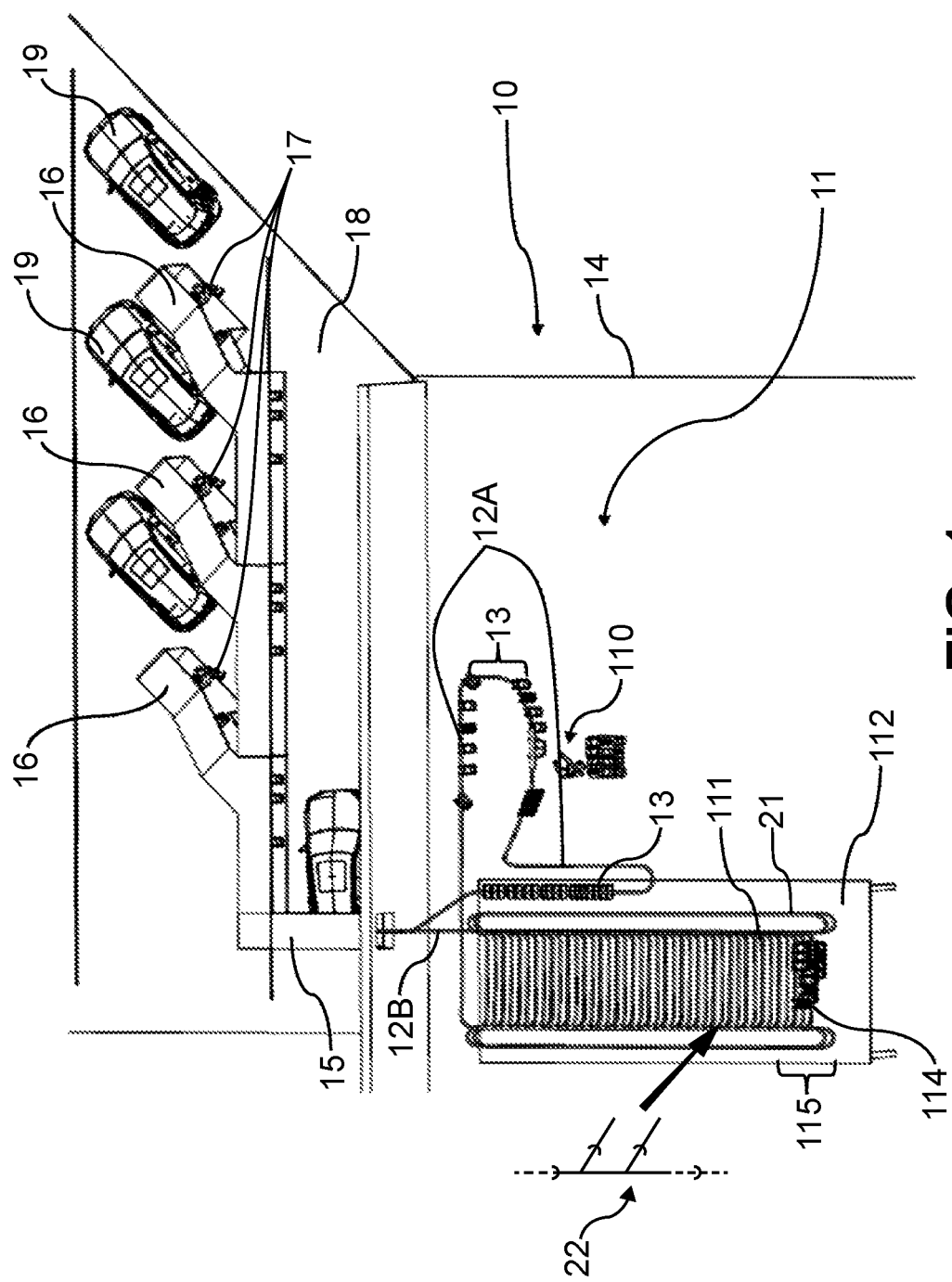
FIG. 1 is a top view of an example embodiment of an order delivery system according to the invention.
Figure 2:
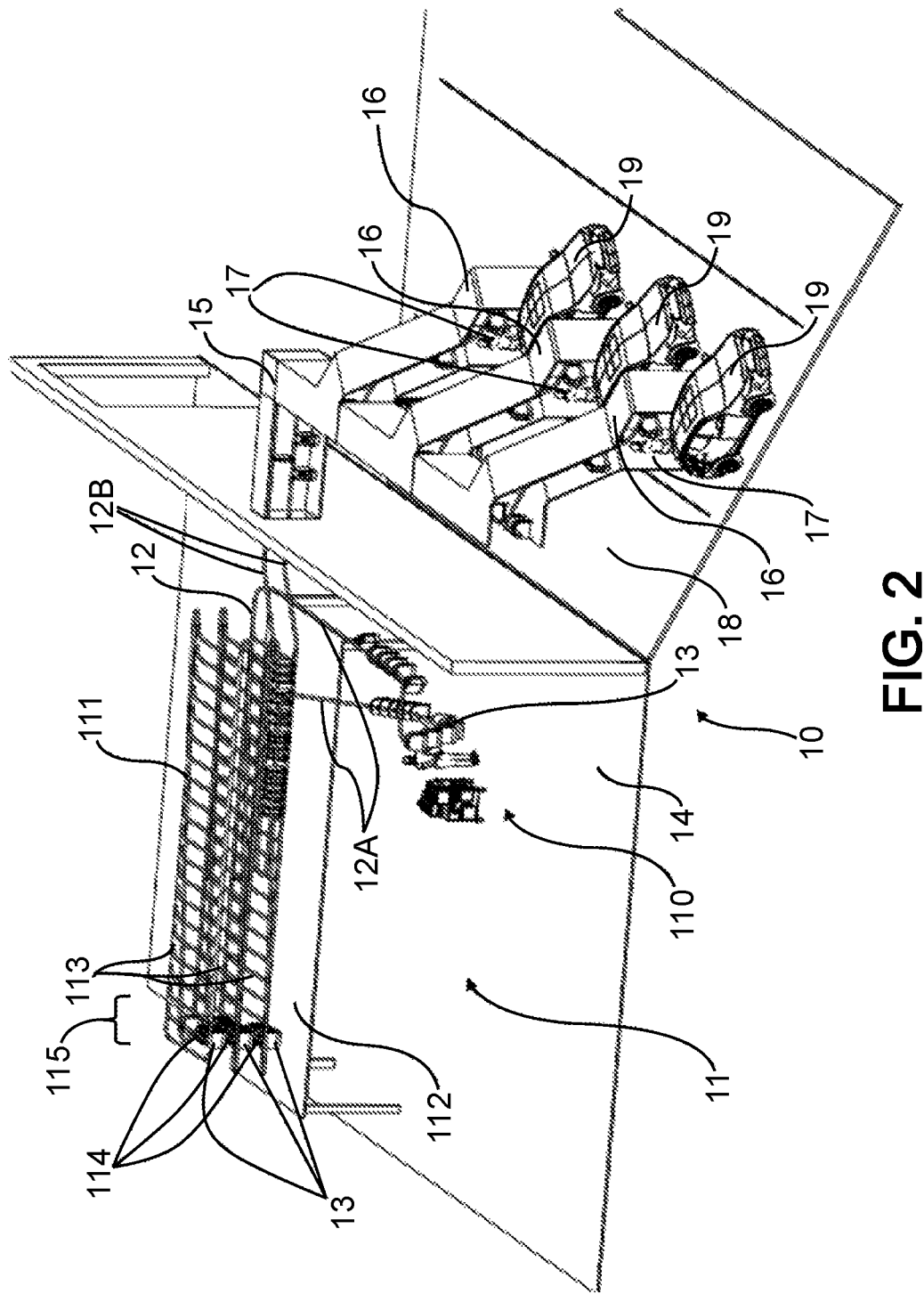
FIG. 2 is a perspective view of the order delivery system shown in FIG. 1.

FIGS. 1 and 2 illustrate, respectively in a top view and a perspective view, an example of an embodiment of an order delivery system 10 according to the invention, implemented on the site of a supermarket.

This system 10 comprises a transport module 11 having a bag circulation track 12 formed by an assembly of rail sections in which motorized chains are mounted (a motor 21 shown schematically in FIG. 1).

In this embodiment of the invention, each bag 13 is suspended from links of a chain 20 (see FIG. 3) in the track by hooks. The movement of the bags along a section of the track is effected automatically by driving the chain 20 mounted in that track, and transfer devices, such as, for example, pushers, are provided for moving the bags 13 from one chain 20 to another.

The track 12 is located in a warehouse 14 adjacent to the sales area of the supermarket and extends outside the warehouse through a tunnel 15 which leads to three order picking stations 16 having an opening to allow customers 17 receiving an order to pick up the bags containing the various items in their order.

The high tunnel advantageously runs above a traffic lane 18 allowing customers to park their vehicle 19 within arm's reach of an order picking station.

The track 12 comprises a first loop 12A which allows bags to be circulated between a loading station 110 and a storage area 111 supported by a mezzanine 112, and a second loop 12B which allows bags to be conveyed between the storage area 111 and the picking stations 16.

As can be seen in FIG. 2, the track has three sets of combs 113 superimposed at the storage area 111. Teeth 114 of the combs located at a distal end 115 of the storage area 111 are immersed in a positive cold storage environment, allowing fresh products to be stored there. The temperature at the other teeth of the combs is the ambient temperature of the warehouse.

Figure 6:
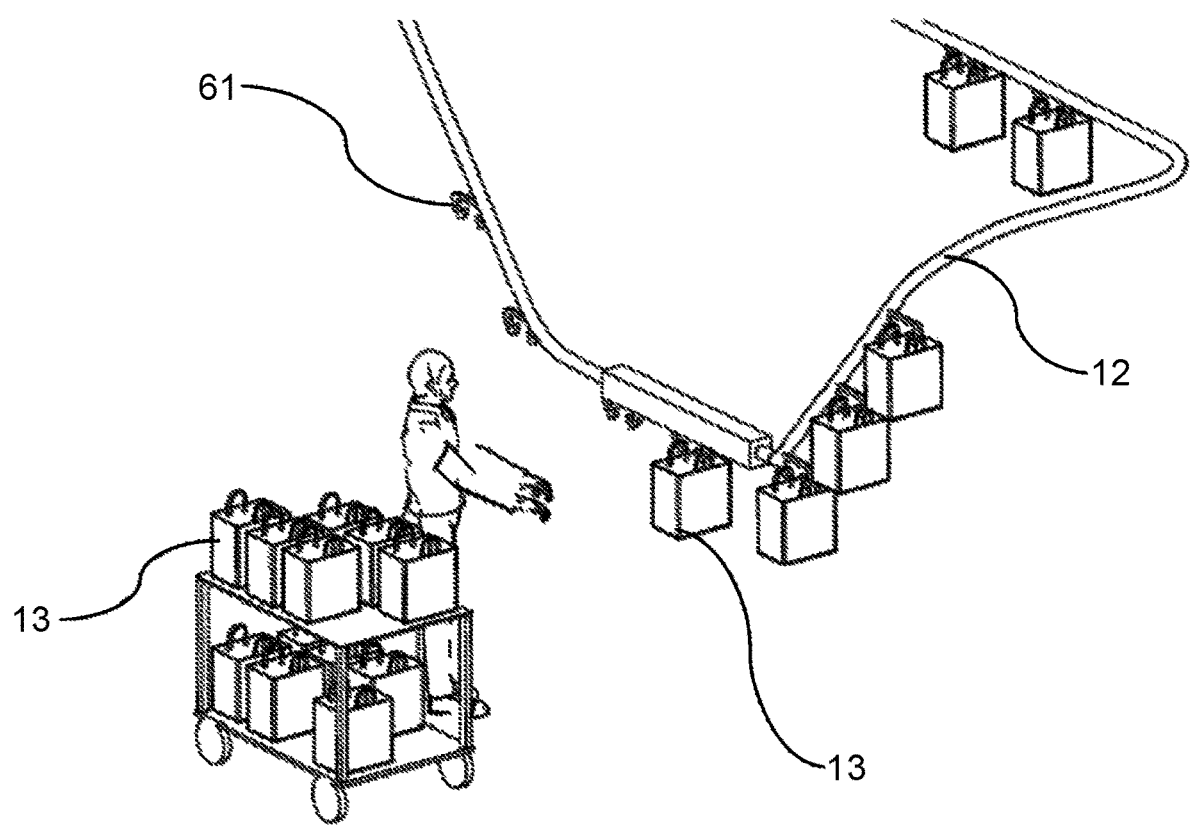
FIG. 6 is a view of the loading station of the order delivery system shown in FIG. 1.

At the loading station 110, pickers arriving with one or more bags containing a portion of an order hang the bags one by one from the hooks in front of them, as shown in FIG. 6.

It will be noted that each of the hooks 61 carries an identifier, which in this particular embodiment of the invention consists of a barcode printed on a plastic strip clipped to the base of the hook 61. This identifier is read by a barcode reader when a hook is presented to the picker and transmitted to the supermarket's warehouse management system (also usually referred to by its acronym WMS, for "Warehouse Management System").

Once a bag 13 has been hung on a hook 61, the picker need only confirm on a terminal, such as a touch pad, that a bag containing a portion of the order has been hung on a hook.

The warehouse management system then assigns the number of the order that has just been validated by the picker on his terminal to the hook whose identifier has been scanned, in its hook assignment database.

Figure 3:
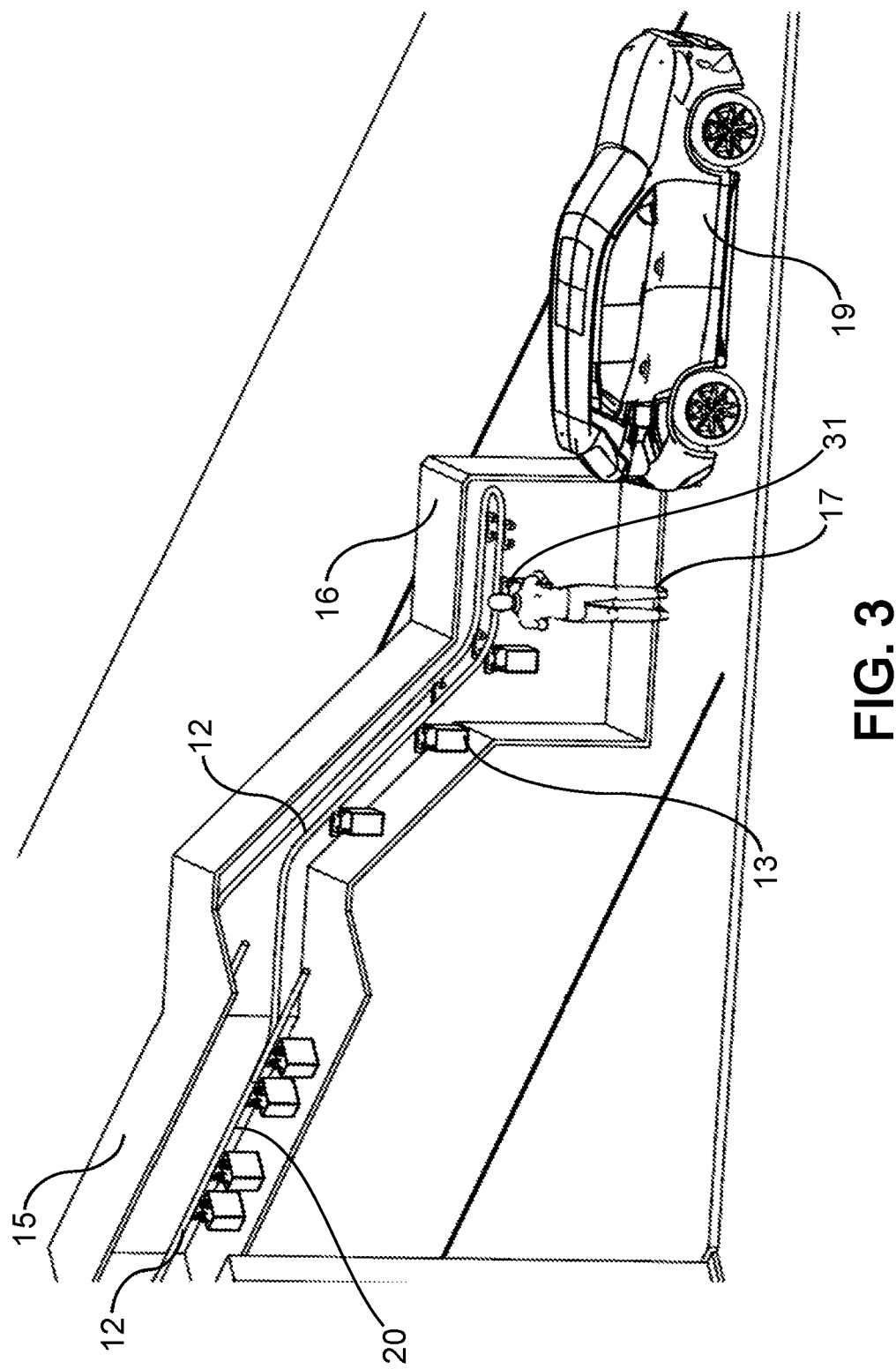
FIG. 3 is a partial cross-sectional detail view of the portion of the order delivery system shown in reference to FIG. 1, located outside the supermarket warehouse.

In FIG. 3, which is a partial cross-sectional detail view of the portion of the order delivery system 10 located outside of the supermarket warehouse, it can be seen that each pick station 16 is equipped with a touch screen 31 that allows the customer to enter a numerical code assigned to their order, which they received via email or SMS (short message service) on their smartphone. Entering this code allows the customer to signal their presence in front of one of the picking stations to the warehouse management system, which will then send a signal to the system 10 containing instructions to deliver the customer's order to the picking station where the customer 17 entered their code. The order delivery system 10 will then route the individual bags containing portions of the customer's order to the tunnel 15 and distribute the individual bags along the stretch of track connecting the tunnel to the pick station 16.

Figure 8:
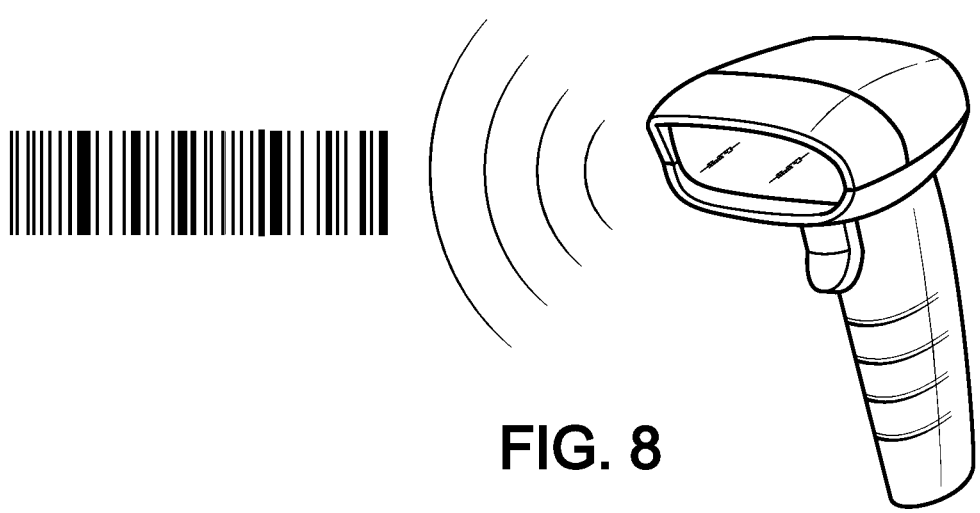
FIG. 8 is a view of a bar code and bar code reader according to an exemplary embodiment.

In variants of this particular embodiment of the invention, it may also be envisaged to allow the customer coming to pick up his order to signal his presence in the vicinity of the picking station by scanning a bar code or a QR code (see FIG. 8) that he has received on his smartphone, by reading the magnetic strip of a store card assigned to this customer, by identifying himself using a biometric identification reader, or by using a dedicated application downloaded on his smartphone. In still other variants of this particular embodiment of the invention, it may be envisaged to use a geolocation system of the customer's smartphone in order to detect his presence in the vicinity of a picking station.

Figure 5:
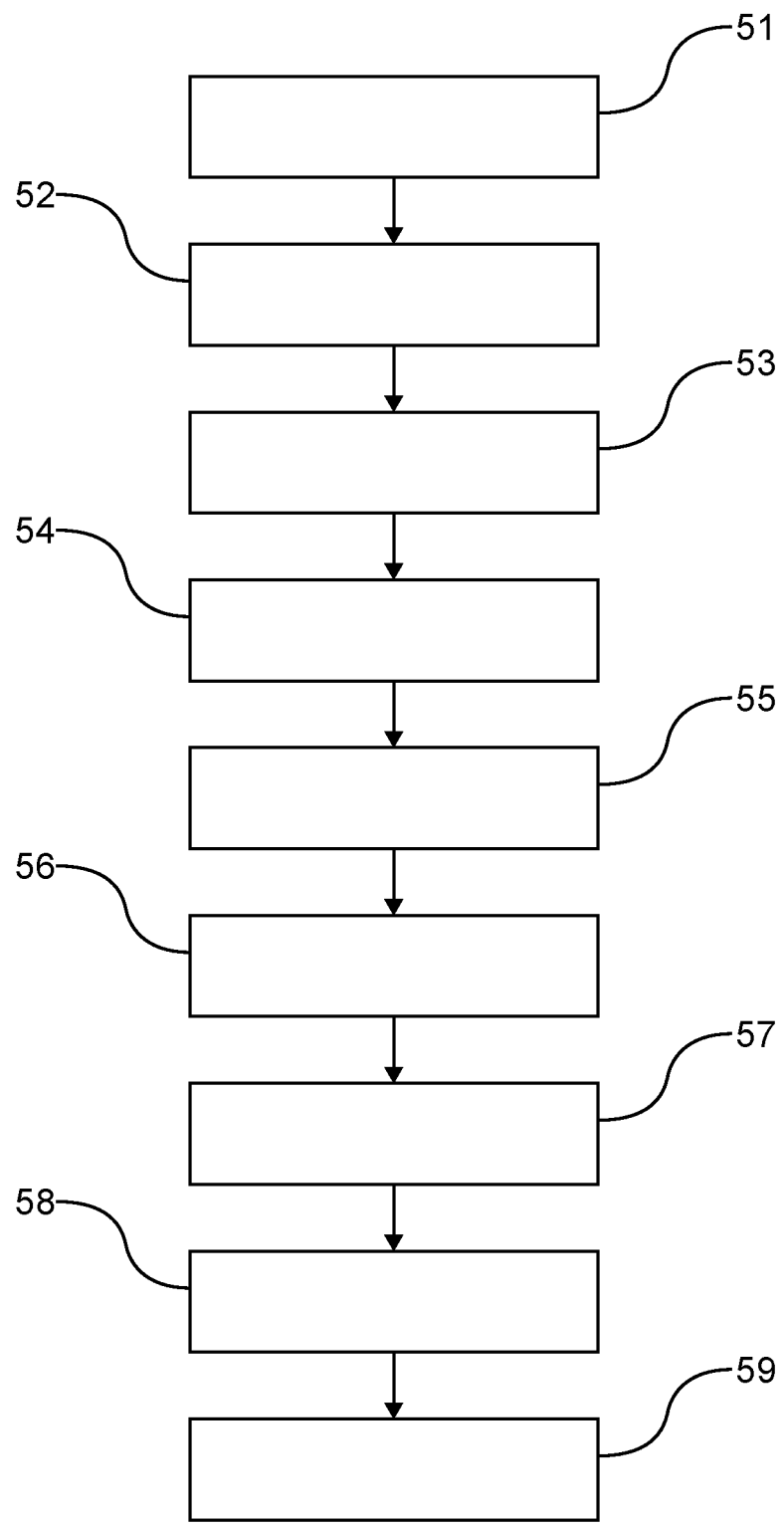
FIG. 5 is a synoptic representation, in the form of a block diagram, of an example of a method for delivering an order according to the invention.

In FIG. 5, the steps of an example of an embodiment of an order delivery method according to the invention implemented using the order delivery system 10 are shown in diagram form.

After the customer has placed an order for various items on the store's website, the warehouse management system sends instructions to pickers to collect the items in the order from the fresh, frozen, and dry goods areas and/or the store's stockroom (step 51). It should be noted that during this step, a picker can collect items for several different orders in the same collection round. During this collection, the pickers deposit the articles together in the same bag or in several bags (step 52).

In a step 53, the pickers go to the loading station 110 as soon as they have completed their pick-up rounds and hang the bags each on a hook of the delivery system of an order 10 that successively comes to the loading station.

It should be noted that, within the scope of the invention, pickers may access the loading station in no predefined order and hang bags in any order from the hooks that present themselves at the loading station 110.

In this step 53, the identifier of each of the hooks that successively present themselves at the loading station is scanned and transmitted to the warehouse management system.

After dropping a bag, the pickers confirm that the loading has been completed using a touch pad and inform which order the bag that was hung on the hook corresponds to and what type of item the bag contains. In an alternative embodiment of the invention, it may also be envisaged that the operators scan a code printed on the order bags. According to this variant, specific codes may be assigned to the bags intended to contain fresh products or frozen products in order to be able to distinguish these bags from other bags. An order identification information is then automatically associated by the warehouse management system to the hook waiting at the loading station (step 54) and this hook is driven on the track of the displacement module, in order to make room for a new hook.

The bags containing articles of an order are then stored, in a step 55, in a comb area of the storage area according to their contents, with fresh articles being directed to area 115, for example.

When a customer signals that he has arrived in the vicinity of an order picking station by entering the code of his order on the touch-sensitive keyboard of the picking station (step 56), a confirmation signal is emitted by the management system and transmitted, for example by radio waves, to the transport module 11 (step 57), which will then, in a first step 58, sort (see arrows 22 in FIG. 1) the hooks in order to group together the hooks with which an identification information of the order has been associated, and consequently the bags which are suspended from these hooks, in a buffer zone of the track 12, before transporting them, in a step 59, through the tunnel 15 to the picking station to which the customer has presented himself, so that he can take out the articles of his order.

6.2. Another Example of an Embodiment of the Invention

Figure 4:
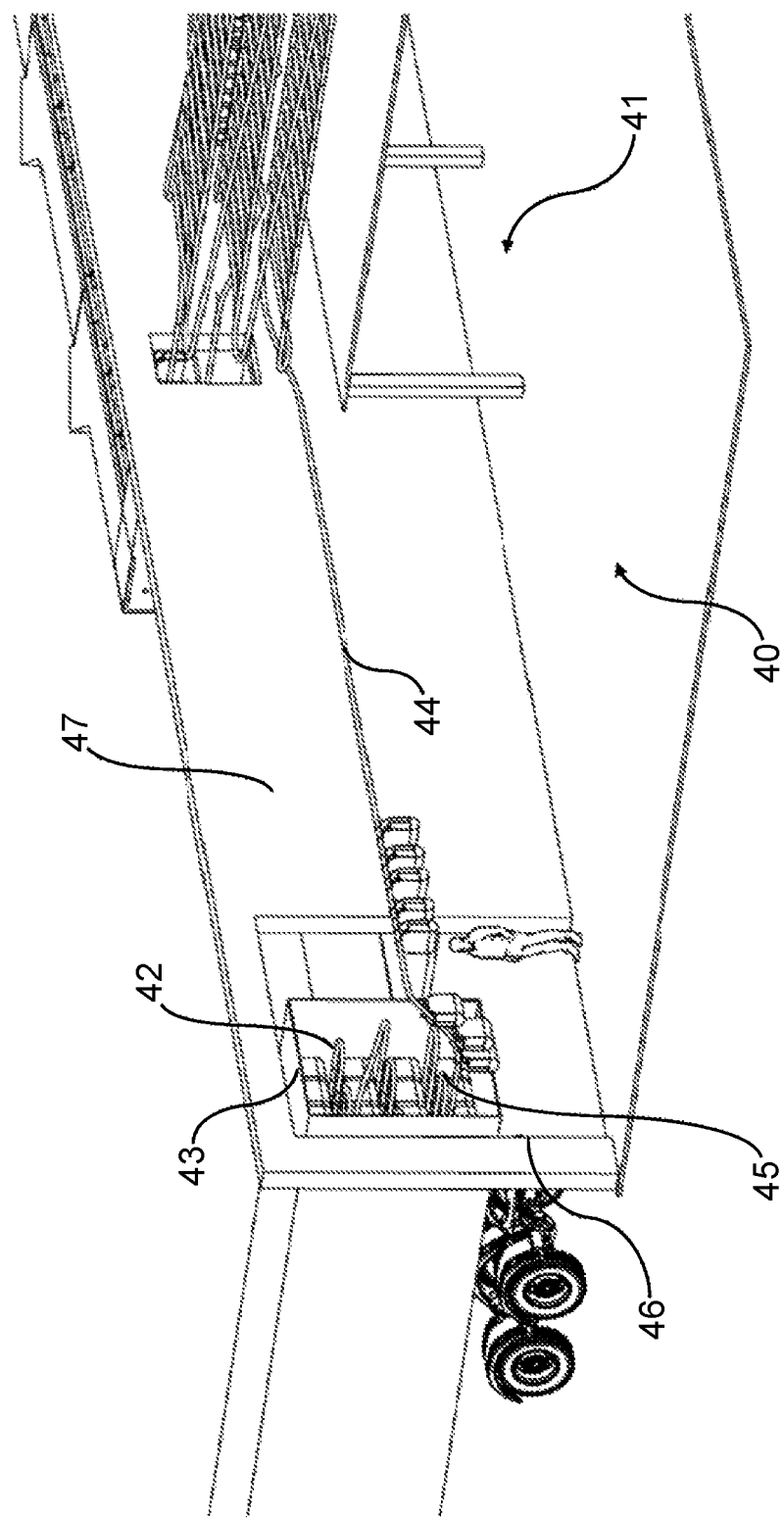
FIG. 4 is a partial perspective view of another example of an embodiment of an order delivery system according to the invention.

FIG. 4 shows another example of an order delivery system 40 according to the invention, allowing an order to be delivered to a truck delivering orders to relay points.

As can be seen in FIG. 4, this system 40 comprises, in addition to a transport module 41 substantially identical to that of the order delivery system 11 described above, a motorized bag storage module 42 suspended from hooks, mounted in the loading volume of a truck 43.

This storage module 42 can be connected to the track 44 of the transport module 41, via a connection unit 45 equipped with a device for transferring bags suspended from hooks between the track 44 and the storage module 42, by moving the rear of the truck backwards to the level of a door 46 pierced in the outer walls of the warehouse 47.

It should be noted that in this embodiment of the invention, the hooked bag transfer device has a reversible operation and can both transfer hooked bags from the track 44 to the storage module 42 and from the storage module to the track 42, in order to unload bags from the truck.

6.3. Another Example of an Embodiment of the Invention

Figure 7:
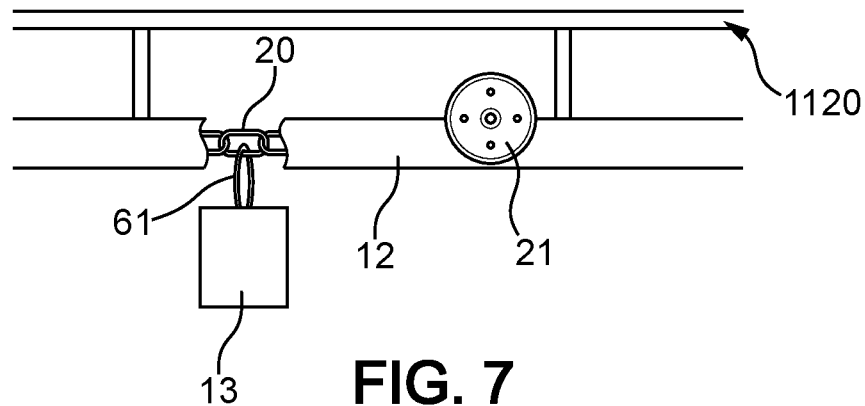
FIG. 7 is a partial side view of a portion of a delivery system having a track supported by a ceiling.

FIG. 7 illustrates a partial side view of a portion a delivery system having a track 12 supported by a ceiling 1120. The track 12 is equipped with an actuator 21, which is shown as a motor to drive the chain 20. A portion of the rail of the track 12 is broken to show the links of the chain 20.

An exemplary embodiment of the invention is intended in particular to overcome the above-mentioned drawbacks of the state of the art.

More specifically, an exemplary embodiment of the invention provides an order delivery technique that limits the number of operator interventions.

An exemplary embodiment provides such a technique for delivering a command that is simple to implement.

An exemplary embodiment provides such a control delivery technique that frees up floor space.

An exemplary embodiment provides such a technique with reduced cost price and reduced operating cost.

Although the present disclosure has been described with reference to one or more examples, workers skilled in the art will recognize that changes may be made in form and detail without departing from the scope of the disclosure and/or the appended claims.

The invention claimed is:

1. A system for automatically delivering an order comprising a plurality of articles stored in a building in at least one bag to a pick-up location for picking up said order located outside said building, wherein the system comprises:
    a transport module mounted at least partially at height and comprising:
        at least one travel track, at least a substantial portion of which extends into said building and comprising a loop which allows the at least one bag to be conveyed between a storage area located inside the building and said pick up location located outside the building, the loop extending outside the building to a vicinity of the pick-up location;
        a plurality of bag suspension elements connected to said track;
        an automatic displacement device, which is configured to automatically move said suspension elements on said track;
    identifying information associated with at least one of the plurality of bag suspension elements from which said at least one bag containing at least one article of said order is suspended;
    a signalling and/or detecting device, which signals or detects presence of a user to whom the order is to be delivered, or of a vehicle to take charge of said order, in the vicinity of said pick-up location;
    said transport module further comprising an actuator, which actuates said automatic displacement device to displace said suspension elements on the at least one travel track from which said at least one bag is suspended, from the storage area to said pick-up location in response to said signalling and/or detection device emitting a signal confirming the presence of said user or said vehicle in the vicinity of said pick-up location.

2. The system of claim 1, wherein said track comprises a chain housed in a rail.

3. The system according to claim 1, wherein said track is attached to a ceiling or a mezzanine of said building.

4. The system according to claim 1, wherein said transport module comprises a sorter for sorting the suspension elements to group together in at least one zone of said building the suspension elements supporting the at least one bag containing articles of the order and to which the identifying information of said order has been associated.

5. The system according to claim 1, wherein said signalling and/or detection device comprises at least one signalling and/or detection element belonging to the group consisting of:
    barcode reader;
    QR code reader;
    magnetic strip or chip reader;
    numeric keypad to enter a code;
    dedicated application downloadable on a user's terminal;
    biometric identification reader, such as a fingerprint reader;
    presence sensor;
    geolocation system.

6. The system according to claim 1, wherein said suspension elements belong to the group consisting of:
    hooks;
    bar.

7. The system according to claim 1, wherein said transport module comprises a device for temporarily storing in a high storage area in the building at least one of said at least one bag suspended from a suspension element.

8. The system according to claim 7, wherein said storage area is a temperature controlled area.

9. The system according to claim 1, wherein said transport module comprises a tunnel enveloping a portion of said track, extending outside said building above a motor vehicle traffic lane.

10. The system according to claim 1, wherein said pick-up location of said order is a loading volume of the vehicle.

11. The system according to claim 10, characterised in that it comprises a bag storage module, intended to be mounted in the loading volume of said truck, and means for connecting said bag storage module with said track, comprising means for transferring the suspension elements from which said bags are suspended from said storage module to said track.

12. A method of automatically delivering an order, comprising a plurality of articles stored in a building, to a pick-up location for said order located outside said building, wherein the method comprises:
    collecting the articles constituting said order and depositing said articles in at least one bag;
    connecting at least one suspension element to a track of a transport module mounted at least partially at height;
    suspending each of said at least one bag from one of the at least one bag suspension element on the track of the transport module mounted at least partially at height, the track comprising a loop which allows the at least one bag to be conveyed between a storage area located inside the building and the pick-up location located inside the building, the loop extending outside the building to a vicinity of said pick-up location;

associating identifying information of the order with said at least one bag suspension element from which said at least one bag containing the at least one article of said order is suspended;

signalling and/or detecting presence of a user to whom the order is to be delivered, or of a vehicle to take charge of said order, in the vicinity of said pick-up location, comprising transmitting a signal confirming the presence of said user or said vehicle in the vicinity of said pick-up location; and upon reception of said signal by a receiver unit, transporting said at least one suspension element to which the identifying information of the order is associated on said track from the storage area to said pick-up location by automatically actuating displacement of said at least one suspension element on said track.

* * * * *